United States Patent

Ando

Patent Number: 6,104,389
Date of Patent: Aug. 15, 2000

[54] BROADCAST RECEIVING METHOD AND BROADCAST RECEIVING APPARATUS THEREFOR

[75] Inventor: Ichiro Ando, Yokosuka, Japan

[73] Assignee: Victor Company of Japan, Ltd., Yokohama, Japan

[21] Appl. No.: 09/096,775

[22] Filed: Jun. 12, 1998

[30] Foreign Application Priority Data

Oct. 31, 1997 [JP] Japan ..................................... 9-316353

[51] Int. Cl.⁷ ..................................................... H04N 7/00
[52] U.S. Cl. ............................ 345/327; 348/906; 348/10
[58] Field of Search .................................. 348/7, 10, 12, 348/906, 564, 565, 568, 461, 468, 473; 345/327

[56] References Cited

U.S. PATENT DOCUMENTS 5,652,613  7/1997  Lazarus et al. ............................... 348/7
6,028,599  2/2000  Yuen et al. ................................. 345/327

FOREIGN PATENT DOCUMENTS 6-30387  2/1994  Japan .

*Primary Examiner*—Nathan Flynn
*Assistant Examiner*—Ngoc Vu
*Attorney, Agent, or Firm*—Eugene Lieberstein; Michael N. Meller

[57] ABSTRACT

A broadcast receiving apparatus comprises the tuner section 12 for receiving a plurality of program-related information transmitted in conjunction with coded sounds and moving pictures, an output device for producing and outputting picture information based on the program-related information, a data compression device for compressing data of the program-related information received by the tuner section 12, the RAM (Random Access Memory) 26 for storing compressed information compressed by the data compression device, a judging device for judging whether the received program-related information are same contents as previously received program-related information which are already stored in the RAM 26 or not, wherein the newly received program-related information are deleted in the case of the same contents, the previously received program-related information are erased and newly received program-related information are stored in the RAM 26 in the case of different contents, and the broadcast receiving apparatus further comprises an information decoding device of decoding information stored in the RAM 26.

5 Claims, 3 Drawing Sheets

BROADCAST RECEIVING METHOD AND BROADCAST RECEIVING APPARATUS THEREFOR

BACKGROUND OF THE INVENTION

1. Field of the Invention

The present invention relates to a broadcast receiving method and relates to a broadcast receiving apparatus, wherein program-related information such as sound and moving pictures are transmitted as a broadcast.

2. Description of the Related Art

There is provided a digital broadcasting system that broadcasts digitally coded programs comprising sounds and moving pictures through a satellite or a cable. The digital broadcasting system can simultaneously transmit a large capacity of programs which is twice to ten times larger than regular analog transmission system does in a given transmission band by using several digital techniques such as compression encoding of sounds and moving pictures, packet multiplexing, and high efficiency digital modulation encoding.

The digital broadcasting system can handle many program service channels which are twice to ten times more than regular analog transmission does in one transmission channel having same transmission band. Further, a number of program service channels and a number of programs can drastically be increased by a frequency multiplexing method in a plurality of transmission channels as a broadcasting system.

Program selection by a listener or a viewer poses new problems since the number of program channels and the number of programs have been increased. The listener or the viewer is obliged to spend his time to select date and time of broadcasting and program service channel of desired programs to be listened or to be watched from a program chart listed on a newspaper or a magazine.

In addition thereto, in a current system for a fee-related restriction to listening to or to watching at a program channel by channel or in a current system for charging for a program to be listened or to be watched channel by channel, it is impossible to manage minutely restriction to listening to or to watching at each program such as movies and sports or to manage precisely a fee charging system for listening to or watching at each program.

Accordingly, to improve the above mentioned problem, there provided a system which transmits program-related information such as contents of program, broadcasting schedule, restriction to listening or watching, and charging for each program in conjunction with encoded data of sounds and moving pictures. On the other hand, a receiving apparatus is provided to indicate or inform the broadcasting schedule, to manage the restriction to listening or watching, or to manage the fee charging system in accordance with the program-related information. However, the program-related information such as contents of program and broadcasting schedule require extension of transmission period to improve program selection, so that a total volume of information is increased by the extension of transmission period.

With assuming that a volume of program-related information is 128 bytes and a number of programs per day per one service channel is 48 programs and a number of total service channels of digital broadcasting service is 100 channels and a transmission period is 2 weeks (14 days), the total volume of information becomes about 8.5 Mbytes. Therefore, memory capacity of a storage device for the program-related information of the receiving apparatus is necessary to be increased, or a method, which periodically transmits information and selectively receives necessary information, is adopted.

In the case of increasing memory capacity, it causes new problem that a cost of the receiving apparatus is increased. In the case of selectively receiving information, a process of program selection operation based on the program-related information is delayed. Furthermore, a transmission volume per unit time for the program-related information increases, if the period of periodical transmitting information is shortened to improve the latter case.

SUMMARY OF THE INVENTION

Accordingly, an object of the present invention is to provide a broadcast receiving method for digital broadcast and a broadcast receiving apparatus suitable for receiving digital broadcast in conjunction with eliminating the aforementioned problems.

In order to achieve the above object, the present invention provides, according to an aspect thereof, a broadcast receiving apparatus which comprises a receiving device of receiving a plurality of program-related information. The broadcast receiving apparatus further comprises a data compression device for compressing data of received program-related information which are received by the above mentioned receiving device, a memory device for storing compressed information which is compressed by the above mentioned compression device, a judging device for judging whether the above mentioned received program-related information are same contents as previously received program-related information already stored in the above mentioned memory device or not, wherein, in the case of same contents, the above mentioned program-related information are deleted and wherein, in the case of different contents, the previously received program-related information are erased and the above mentioned newly received program-related information are stored in the above mentioned memory device, and the broadcast receiving apparatus further comprises an information decoding device for decoding information which are stored in the above mentioned memory device.

According to the aspect of the present invention, there provided a broadcast receiving apparatus which comprises a receiving device for receiving a plurality of program-related information. The broadcast receiving apparatus further comprises a data compression device for compressing data of character data information which are a part of received program-related information received by the receiving device, a memory device for storing compressed character data information mentioned above, which is compressed by the compression device, a judging device for judging whether the newly received character data information is the same contents of previously received character data information already stored in the memory device or not, wherein, in the case of same contents, the newly received character data information are deleted and wherein, in the case of different contents, the previously received character data information are erased and the newly received character data information are stored in the memory device, and the broadcast receiving apparatus further comprising an information decoding device for decoding information which are stored in the memory device.

According to another aspect of the present invention, the above mentioned broadcast receiving apparatus is further characterized that the judging device erases a part of contents of previously received character data information stored in the memory device and selectively supplies new character data information to the memory device, if contents of the character data information of newly received program-related information differ from those of previously received and stored program-related information.

According to another aspect of the present invention, there provided a broadcast receiving method having a receiving step of receiving a plurality of program-related information. The broadcast receiving method further comprises a data compression step of compressing data of received program-related information which are received in the receiving step, a memorizing step of storing compressed information which are compressed in the compression step, a judging step of judging whether the received program-related information are same contents as previously received program-related information already stored in the memorizing step or not, wherein, in the case of same contents, the program-related information are deleted and wherein, in the case of different contents, the previously received program-related information are erased and the newly received program-related information are stored in the memorizing step, and the broadcast receiving method having a information decoding step of decoding information which are stored in the memorizing step.

In more specific aspect of the present invention, there provided a broadcast receiving method having a receiving step of receiving a plurality of program-related information. The broadcast receiving method further comprises a data compression step of compressing data of character data information which are a part of received program-related information received in the receiving step, a memorizing step of storing compressed above mentioned character data information which are compressed by the compression step, a judging step of judging whether the newly received character data information are same contents as previously received character data information already stored in the memorizing step or not, wherein, in the case of same contents, the newly received character data information are deleted and wherein, in the case of different contents, the previously received character data information are erased and the newly received character data information are stored in the memorizing step, and the broadcast receiving method further comprising an information decoding step of decoding information which are stored in the memorizing step.

Other object and further features of the present invention will be apparent from the following detailed description when read in conjunction with the accompanying drawings.

DETAILED DESCRIPTION OF THE PREFERRED EMBODIMENTS

[First Embodiment]

Figure 1:
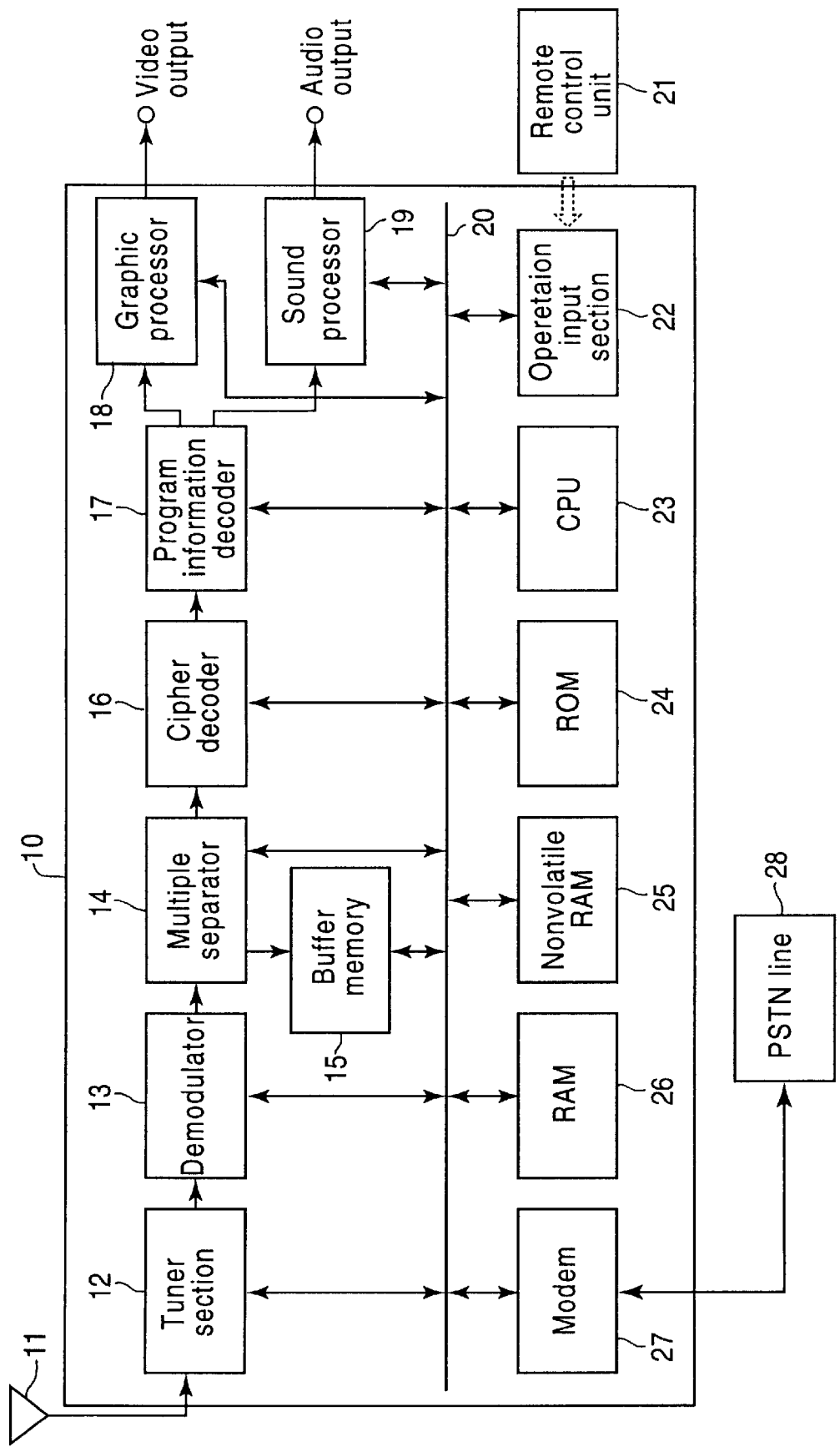
FIG. 1 shows a block diagram of a broadcast receiving apparatus according to an embodiment of the present invention.

In FIG. 1, a main signal system of a broadcast receiving apparatus 10 comprises a tuner section 12 which is supplied with signals from a satellite through an antenna 11, a demodulator 13, a multiple separator 14, a cipher decoder 16, a program information decoder 17, a graphic processor 18, and a sound processor 19. The graphic processor 18 outputs final video signals and the sound processor 19 outputs final audio signals. Respective final video and audio signals are supplied to a television receiver, which is not shown.

An auxiliary signal system and a control system of the broadcast receiving apparatus 10 comprises a buffer memory 15, an operation input section 22 which is supplied with information control signals from an external remote control unit 21, a control CPU 23, a ROM (Read Only Memory) 24, a nonvolatile RAM (Random Access Memory) 25, a RAM 26, and a modem 27. The modem 27 is connected to an external public switched telephone network (PSTN) line 28. The main and auxiliary signal systems and the control system of the broadcast receiving apparatus 10 are controlled to receive or to transmit respective signals through a main bus 20.

Program selecting information are supplied to the operation input section 22 of the broadcast receiving apparatus 10 upon manipulation of such as remote control unit 21 and the program selecting information are further forwarded to the control CPU 23. The control CPU 23 stores the program selecting information in a register integrated in the control CPU 23 and controls the tuner section 12 which is supplied with radio wave from the satellite through the antenna 11, the multiple separator 14, and the cipher decoder 16 to receive and to reproduce an objective program in accordance with decoded program-related information which are stored in the RAM 26.

In the tuner section 12, an objective digitally modulated signal is selected out of a plurality of digitally modulated signals which are frequency muliplexed and transmitted from transmitting devices not shown in FIG. 1 under the control of the control CPU 23. The demodulator 13 demodulates the objective digitally modulated signal selected in the tuner section 12. The multiple separator 14 separates a packet of objective selected program information from plural programs of demodulated digital data and transfers the objective packet to the cipher decoder 16 under the control of the control CPU 23.

In case that the packet of the objective selected program information is ciphered, the control CPU 23 forwards ciphered decoding key data which are obtained by a predetermined process in accordance with restriction information of listening to or viewing programs and charging information to the cipher decoder 16. The cipher decoder 16 decodes ciphered information. The decoded information decoded by the cipher decoder 16 are transferred to the program information decoder 17.

Obtaining the above mentioned ciphered decoding key is as follows. The control CPU 23 makes access to a host computer (not shown in FIG. 1) of a control center of ciphered decoding key through the modem 27 and the PSTN line 28. The control CPU 23 transfers to the host computer an identification (ID) of the receiving device, information about listening or viewing condition, and program ID when the control CPU 23 is connected to the host computer.

The host computer judges whether listening or viewing of program can be permitted or not in accordance with the received information. The host computer transfers a ciphered decoding key data to the control CPU 23, in case that listening or viewing of program is permitted. In the case of program to be charged, the host computer records that the program to be charged is listened or viewed and charges listening or viewing fee in accordance with a listening or viewing record.

In addition thereto, a telephone number of the control center and the ID of the receiving device are preliminary recorded in the ROM 24 in conjunction with a CPU processing program. A listener or a viewer stores information about listening or viewing condition in the nonvolatile RAM 25. A program ID is stored in the RAM 26 as a part of program-related information, explanation of which will follow.

The program information decoder 17 decodes compressed coded data of sound and video signals and transfers video data and audio data to the graphic processor 18 and the sound processor 19 respectively, wherein information deciphered by the cipher decoder 16 are supplied to the program information decoder 17.

The graphic processor 18 and the sound processor 19 produce picture signals and sound effects in response to a control of or information from the control CPU 23 and output respective video output and audio output, wherein the graphic processor 18 and the sound processor 19 switch the produced picture signals and sound effects over to video data and audio data from the program information decoder 17 or synthesize them.

Figure 2:
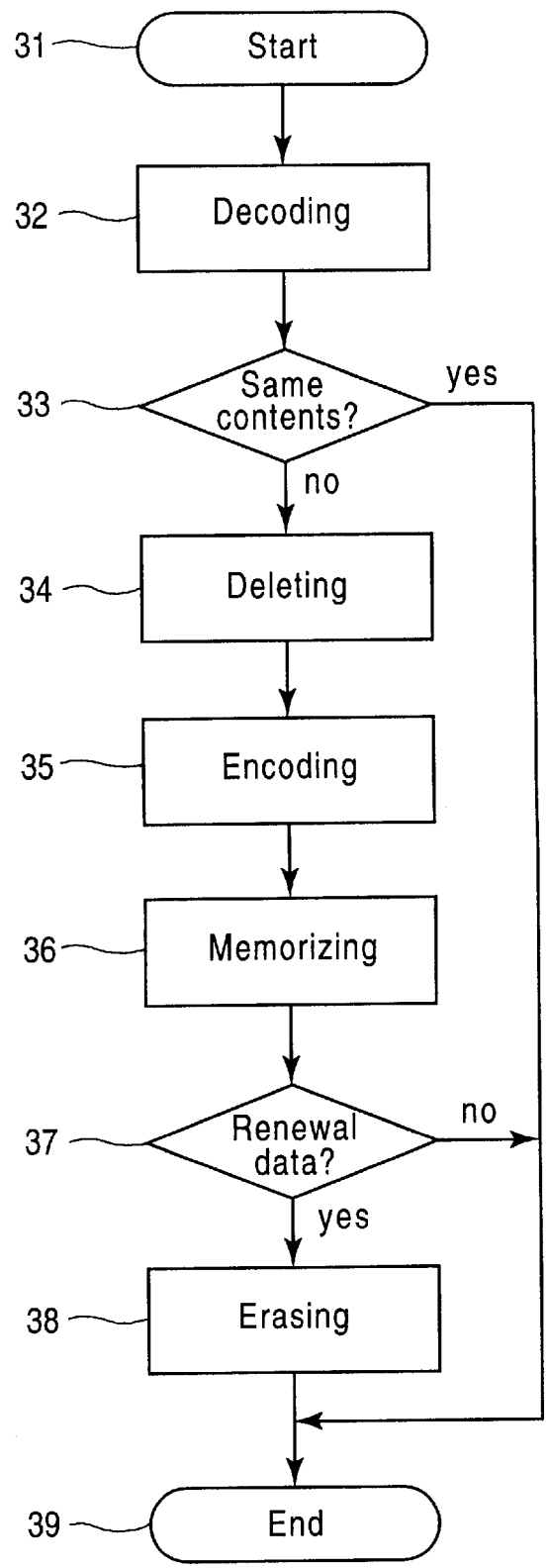
FIG. 2 shows a operation flow chart of writing information into a control CPU (Central Processing Unit) with a register or a microprocessor of the broadcast receiving apparatus according to the embodiment of the present invention.

In FIG. 2, a process of writing information into the control CPU 23 is depicted in detail. Packets of program-related information in decoded digital data are separated by the multiple separator 14 and are stored in the buffer memory 15 temporally. After a start (step 31) the control CPU 23 serially reads out the packets of program-related information which are temporally stored in the buffer memory 15 and decodes the read out packets (step 32). The control CPU 23 performs compression coding and decoding in a time sharing manner as explained later as well as controlling the broadcast receiving apparatus totally. Therefore, it is necessary to store the separated program-related information in the buffer memory 15 temporally.

The control CPU 23 judges or discriminates whether contents of the decoded program-related information are the same as those of the previously decoded information or not (step 33). In the case of the same contents, that is, in case that contents of newly decoded program-related information are the same as those of program-related information which have been previously received and stored in the RAM 26, the program-related information newly decoded by the control CPU 23 are deleted and the process comes to an end (step 39).

In case that contents of newly decoded program-related information are different from those of previously decoded program-related information, character or text data information of the previously decoded program-related information are selectively deleted (step 34). New character data are compression coded (step 35) and stored in the RAM 26 as coded character data in conjunction with other information (step 36).

It is possible to skip the step 34 as a variation of the embodiment of the present invention. Instead of selectively deleting character data information of the previously decoded program-related information, the character data information of the previously decoded program-related information are compression coded and the character data information are stored in the RAM 26 as coded character data in conjunction with the other information. In this application, an operation flow chart is not shown. However, the operation flow chart is the same as shown in FIG. 2 except the step 34 to be skipped since information are not selectively deleted.

In the case of renewal of contents of the previously decoded program-related information (step 37), the renewed data are stored in the RAM 26 and the previously stored data are erased (step 38).

A method of data compression coding for character information of the above mentioned program-related information is realized by a reversible data compression coding method or a noise-free compression coding method such as Huffman coding method and Lempel-Ziv coding method. The character information in the above mentioned program-related information can be completely decoded by the reversible data compression coding method when they are decoded.

A coding method utilizing a nature that appearing probability of each alphabet in English sentences is biased to specific letters, can reduce a total amount of information. The Huffman coding method encodes information by using a code table that is formed in accordance with a predetermined model of generation probability. Generally, the Lempel-Ziv coding method can encode information more effectively than the Huffman coding method of using a fixed code table since the Lempel-Ziv coding method adapts statistical characteristics of objects to be coded by using a slide dictionary method or a dynamic dictionary method. It is reported that a compression rate of character data in English is 80% by the Huffman coding method and 40% by the Lempel-Ziv coding method. (From the article "Understanding reversible compression algorithm" written by Mr. Tomohiko Uematsu and Mr. Shigehiro Miyashita, monthly magazine "Interface" August issue in 1992).

Referring back to FIG. 2, in case that contents of the above mentioned decoded program-related information are different from those of previously decoded information (step 33), a part of character information of the program-related information are selectively deleted (step 34) and the character information are stored in the RAM 26. The above mentioned case is further depicted in detail as follows. An amount of memory information in the RAM 26 can be drastically reduced by a data compression coding method since a ratio of character data information such as program name and contents of program to program-related information is relatively high. An amount of information to be stored in the RAM 26 can be reduced furthermore by deleting selectively a part of character information included in program-related information.

Character data information of program-related information include title of each program and explanation of contents of each program. The broadcast receiving apparatus memorizes an amount of program-related information equivalent to two weeks, for example, in the RAM 26. Character data information regarding name of each program and explanation of contents of each program of the first week are encoded by the data compression coding method and stored in the RAM 26 in conjunction with other information. For the program-related information of the second week, character data information of explanation of contents of each program are deleted and only character data information of program names are encoded by the data compression coding method and stored in the RAM 26 in conjunction with other information. Program information which have been already broadcasted are erased. Information about explanation of program contents of a first week of newly received program-related information equivalent to the two weeks are stored in the RAM 26 in addition to the previously stored program names. An amount of memory information is further decreased by the above mentioned process. In addition thereto, in the case of renewing contents of previously decoded information, the renewed information are stored in the RAM 26 and the previously stored information are erased.

Figure 3:
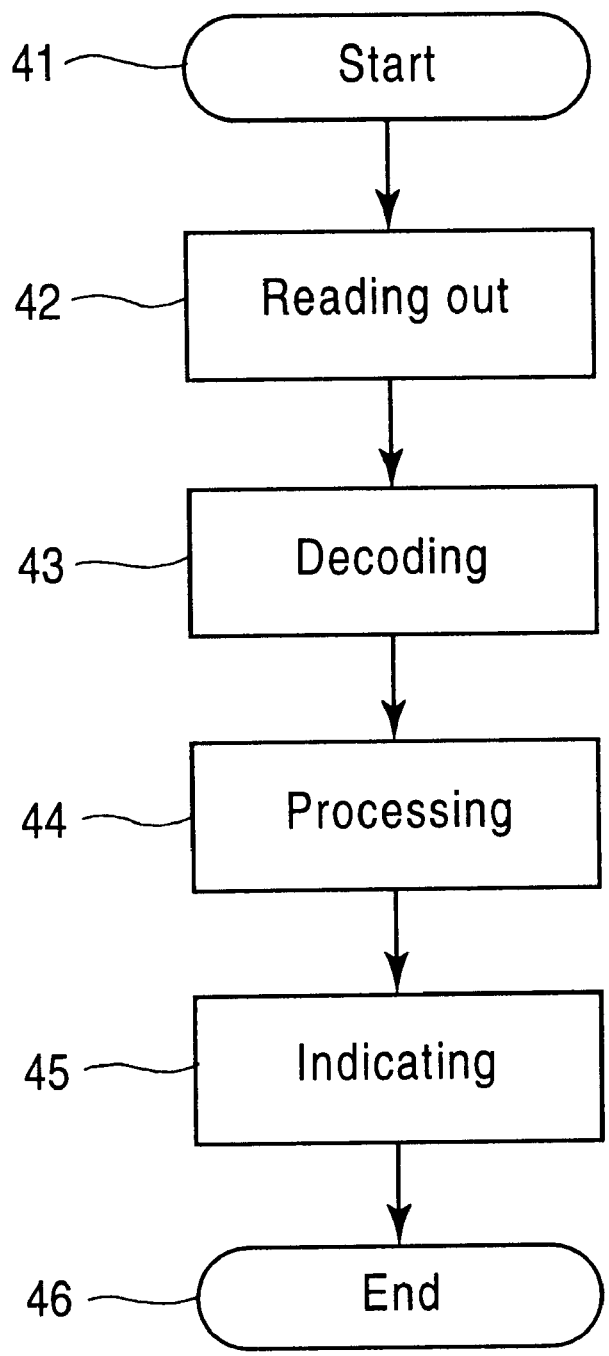
FIG. 3 shows an operation flow chart of reading out information from the control CPU according to the embodiment of the present invention.

In FIG. 3, a process of reading out information by the control CPU 23 is depicted in detail. After the operation starts as step 41, the control CPU 23 reads out program-related information such as character data information from the RAM 26 (step 42) when the control CPU 23 is instructed to indicate a program schedule by the operation input section 22. The character data, which have been encoded by the compression coded method, are decoded (step 43) and edited by predetermined process of information in accordance with conditions of indication instruction (step 44).

Editing of processing information is to rearrange information such as by time sequence of a same service channel or by each service channel sequence in a same timing. The control CPU 23 transfers edited program-related information to the graphic processor 18 in conjunction with control information from the control CPU 23 so as to produce pictures in accordance with predetermined specifications for indicating program schedule.

Further, the control CPU 23 transfers control information to the sound processor 19 for producing predetermined sound effects. The graphic processor 18 produces pictures in response to the control information and the program-related information, which are transferred from the control CPU 23. The graphic processor 18 switches the produced pictures over to video data from the program information decoder 17 or vice versa, or synthesizes the produced pictures and video data, then outputs them as a video output to a television receiver which is not shown (step 45). On the other hand, the sound processor 19 produces sound effects in response to the control information. The sound processor 19 switches the produced sound effects over to audio data from the program information decoder 17 or vice versa, or synthesizes the produced sound effects and the audio data, then outputs thereof as an audio output to the television receiver not shown (step 45). The process comes to an end (step 46).

According to the present invention, a broadcast receiving apparatus is provided. The broadcast receiving apparatus compresses received program-related information, stores the compressed program-related information, and judges or discriminates whether contents of the received program-related information are the same as those of previously stored program-related information or not. In the case of the same contents, the received program-related information are deleted. In the case of different contents, the received program-related information are stored. Therefore, capacity of memory for storing program-related information can be reduced.

In addition thereto, character data information which are a part of the program-related information are compressed and discriminated whether contents of newly received character data information are the same as those of previously stored character data information or not. In the case of the same contents, new character data information are deleted. In the case of different contents, the previous character data information are renewed by the new character information. Therefore, capacity of memory for storing character data information can be drastically reduced.

In more specific aspect of the present invention, high speed processing of program-related information can be realized. A listener or a viewer can choose desired programs in a short time although there exists numbers of service channels and programs. Furthermore, a period of transmitting program-related information periodically can be extended by storing program-related information effectively in a memory. Therefore, a transmission amount per unit time for program-related information can be reduced.

What is claimed is:

1. A broadcast receiving apparatus comprising:

receiving means for receiving program-related information, wherein said program-related information include information about other channels as well as information about a specific channel in one broadcasting system;

data compression means for compressing data of said program-related information received by said receiving means;

memory means for storing compressed data compressed by said data compression means;

information decoding means for decoding said compressed data stored in said memory means; and judging means for judging whether received said program-related information are same contents as previously received program-related information already stored as said compressed data in said memory means or not, wherein said program-related information are deleted in case of same contents, and wherein the previously received program-related information are erased and newly received said program-related information are stored as said compressed data in said memory means in case of different contents.

2. A broadcast receiving apparatus comprising:

receiving means for receiving program-related information, wherein said program-related information include information about other channels as well as information about a specific channel and character data in one broadcasting system;

data compression means for compressing data of character data received by said receiving means;

memory means for storing compressed data compressed by said data compression means;

information decoding means for decoding said compressed data stored in said memory means; and judging means for judging whether newly received said character data are same contents as previously received character data already stored as compressed data in said memory means or not, wherein newly received said character data are deleted in case of same contents, and wherein the previously received character data are replaced with newly received said character data and said character data are stored in said memory means as compressed data in case of different contents.

3. A broadcast receiving apparatus in accordance with claim 2, wherein a part of contents of said character data are deleted and other parts of contents are selectively supplied to said memory means, in case that contents of said character data are different from contents of the previously stored character data already stored in said memory means as said compressed data.

4. A broadcast receiving method comprising:

a receiving step of receiving program-related information, wherein said program-related information include information about other channels as well as information about a specific channel in one broadcasting system;

a first memorizing step of storing said program-related information received in said receiving step;

a judging step of judging whether newly received said program-related information stored in said first memorizing step are same contents as previously received program-related information previously stored or not;

a deleting step of deleting newly received said program-related information judged as same contents in said judging step;

a data compression step of compressing data of newly received said program-related information judged as different contents in said judging step;

a second memorizing step of storing compressed data of said program-related information compressed in said data compression step; and an information decoding step of decoding said compressed data stored in said second memorizing step.

5. A broadcast receiving method comprising:

a receiving step of receiving program-related information, wherein said program-related information include information about other channels as well as information about a specific channel and character data in one broadcasting system;

a first memorizing step of storing said program-related information received in said receiving step;

a judging step of judging whether newly received said character data stored in said first memorizing step are same contents as previously received character data previously stored or not;

a deleting step of deleting newly received said character data judged as same contents in said judging step;

a data compression step of compressing data of newly received said character data judged as different contents in said judging step;

a second memorizing step of storing compressed character data compressed in said data compression step; and an information decoding step of decoding said compressed character data stored in said second memorizing step.

* * * * *